United States Patent [19]
Linick

[11] Patent Number: 5,988,562
[45] Date of Patent: Nov. 23, 1999

[54] SYSTEM AND METHOD FOR DETERMINING THE ANGULAR ORIENTATION OF A BODY MOVING IN OBJECT SPACE

[76] Inventor: James M. Linick, 7855 Vizcaya Way, Naples, Fla. 34108

[21] Appl. No.: 08/964,792

[22] Filed: Nov. 5, 1997

[51] Int. Cl.[6] .............................. F41G 7/00; B64C 13/18
[52] U.S. Cl. .................. 244/3.21; 73/178 R; 244/3.1; 244/175; 701/4; 701/6
[58] Field of Search .......................... 73/178 R, 514.02; 244/75 R, 3.1, 3.2, 3.21, 175; 701/4, 5, 6

[56] References Cited

U.S. PATENT DOCUMENTS

| | | | |
|---|---|---|---|
| 3,693,909 | 9/1972 | Hall | 244/3.2 |
| 3,938,258 | 2/1976 | Zook | 33/366 |
| 3,948,096 | 4/1976 | Miller | 73/178 R |
| 4,026,498 | 5/1977 | Platus | 244/3.23 |
| 4,054,254 | 10/1977 | Cole | 244/3.21 |
| 4,277,895 | 7/1981 | Wiklund | 33/366 |
| 4,297,905 | 11/1981 | Hadekel | 74/5.43 |
| 4,316,394 | 2/1982 | Dohogne | 74/5.46 |
| 4,328,938 | 5/1982 | Reisman et al. | 244/3.1 |
| 4,390,950 | 6/1983 | Muller | 364/434 |
| 4,470,562 | 9/1984 | Hall et al. | 244/3.2 |
| 4,535,353 | 8/1985 | Turner | 348/605 |
| 4,608,641 | 8/1986 | Snell | 364/434 |
| 4,676,456 | 6/1987 | Grosso et al. | 244/3.21 |
| 4,679,748 | 7/1987 | Blomqvist et al. | 244/3.19 |
| 4,899,956 | 2/1990 | King et al. | 244/3.21 |
| 4,901,565 | 2/1990 | Seidel et al. | 73/178 R |
| 5,131,602 | 7/1992 | Linick | 244/3.14 |
| 5,372,334 | 12/1994 | Cuadros | 244/3.11 |
| 5,379,968 | 1/1995 | Grosso | 244/3.21 |
| 5,425,514 | 6/1995 | Grosso | 244/3.22 |
| 5,440,817 | 8/1995 | Watson et al. | 33/366 |
| 5,647,558 | 7/1997 | Linick | 244/3.11 |

OTHER PUBLICATIONS

NASA Report: NASA–TM–100659 (Abstract only), Jul. 1988.
NASA Report: NASA–TM–104161 (Abstract only), Oct. 1991.

*Primary Examiner*—Charles T. Jordan
*Assistant Examiner*—Theresa M. Wesson
*Attorney, Agent, or Firm*—Hunton & Williams

[57] ABSTRACT

A system and method for determining the angular orientation of a body moving in object space. The invention is usable to detect and identify the angular orientation of the body relative to the theoretical plane of gravity and thereby relative to any other theoretical plane between zero and three-hundred sixty degrees therefrom. The invention is operable regardless of whether the body is rotating with an angular velocity, either natural and/or induced. The invention may employ one or more analog and/or digital sensors. The analog sensor may be an accelerometer. The system may be used to provide real-time orientation data to permit the body to be guided or directed towards a desired destination or simply to permit the orientation of the body to be known, controlled or varied as desired.

22 Claims, 4 Drawing Sheets

SYSTEM AND METHOD FOR DETERMINING THE ANGULAR ORIENTATION OF A BODY MOVING IN OBJECT SPACE

FIELD OF THE INVENTION

The present invention relates generally to angular reference systems, and more particularly to a system and method for determining the angular orientation (e.g., the vertical and/or horizontal orientation) of a body moving in object space.

BACKGROUND

In many fields, the angular orientation of a body (e.g., the rotational orientation or "roll" of the body relative to some reference plane) must be determined. This determination may be needed to permit the body to be guided or directed towards a desired destination or simply to permit the orientation of the body to be known, controlled or varied as desired. In many cases, the determination must be made while the body is moving along a velocity vector in object space—within a six degree of freedom spatial model. Various systems for determining the angular orientation of a moving body are known, however each of these systems suffers from at least one of several inherent problems.

For example, an electrostatic/electromagnetic roll reference sensor is known which can be used to determine a vertical reference (relative to the plane of gravity) for a spin-stabilized projectile moving in object space. See, e.g., U.S. Pat. No. 4,328,938 to Reisman et al. which discloses such a sensor. In addition, antenna systems which transmit varying signals to ground-based equipment can be used to calculate projectile roll. See, e.g., U.S. Pat. No. 5,372,334 to Cuadros. Similarly, gyroscopes which can be used to determine vertical are also known. See, e.g., U.S. Pat. No. 4,297,905 to Hadekel. Finally, various needle-and-ball, pendulum, radar/barometric altimeter, and aircraft-type wing attitude devices are known.

Each of the aforementioned devices, however, suffers from specific problems. For example, the Reisman roll reference sensor requires complex support circuitry and further requires that the body be moving along a spin-stabilized trajectory. Moreover, the system must be reconfigured for use in different hemispheres. Similarly, the Cuadros antenna system requires a complex ground-based transceiver, requires that the body be spin-stabilized and will only operate in line-of-sight applications. The Hadekel gyroscopic system requires an expensive, complex gyroscope and support componentry.
The remaining systems suffer from similar complexity, cost and/or technical problems.

What is needed, therefore, is a simple, rugged, inexpensive angular reference system which can be used to determine the roll orientation of a body moving in object space. Ideally, the system should be operable anywhere and under any conditions from low g's launch to, for example, cannon launched and anywhere around or about the planet earth and even within other gravitational networks, should operate beyond the horizon, and should operate regardless of whether the body is rotating with an angular velocity (either natural or induced).

SUMMARY OF THE INVENTION

To overcome the problems of conventional systems used to determine angular orientation, the present invention uses a sensor to measure (indirectly) variations in the angle of attack of a moving body. The sensor may preferably be analog, such as an accelerometer, or digital. The sensor is mounted on or in the moving body, and positioned to output a signal in proportion to variations in the angle of attack of the body.

The output of the sensor varies in proportion to the force (F) acting on the body which varies (e.g., reduces or increases) the angle of attack. Owing to the perpetual force of gravity, and wind vectors, which to objects moving along a velocity vector anywhere within a planetary atmosphere, will always be horizontal, e.g., perpendicular to the plane of gravity, force F will always be in a direction parallel to the plane and to the force of gravity (either complementing the force of gravity or in opposition thereto). Thus, by processing the output of the sensor, the angular (roll) orientation of the body (relative to the plane of gravity) can be determined. Moreover, because gravity is present throughout the universe, the present invention has potential to be operable everywhere.

For example, by positioning the sensor along the longitudinal axis of the body to sense forces perpendicular to that axis and parallel to the plane of gravity, the body polarity can be accurately determined.

The present invention will operate equally well in objects which rotate with an angular velocitc and/or in objects which have little or no rotational movement. Various processing/computational means may be employed to process the output of the sensor and to determine the angular orientation. In addition, conventional filtering and/or integration techniques may be employed to further enhance accuracy of the system.

Further features and advantages of the present invention, as well as the structure and operation of various embodiments of the invention, are described in detail below with reference to the accompanying drawings.

BRIEF DESCRIPTION OF THE DRAWINGS

The foregoing features and advantages of the present invention will be apparent from the following detailed description of the invention, as illustrated in the accompanying drawings. In the drawings, like reference numbers indicate identical or functionally similar elements, wherein.

DETAILED DESCRIPTION OF THE INVENTION

The present invention comprises a system and method for determining the angular orientation of a body moving in object space. While the present invention is described in detail in its application to certain types of moving bodies, one skilled in the art will recognize that the present invention can be applied to many other body types as well. For example, the body moving in object space could be any form of manned or unmanned vehicle (e.g., an aircraft or space shuttle), a constantly powered missile, rocket or projectile, a body in inertial flight owing to an initial impulse (e.g., a tube- or gun-launched vehicle) or any other body which moves along a velocity vector in object space and has and will always have an associated angle of attack.

In one embodiment, the invention comprises a system which can sense, detect and identify, with a high degree of accuracy, a directional reference for the moving body. The system can be contained entirely aboard the moving body, and can operate without the need for associated ground-, air- or space-based support equipment. Moreover, the directional reference which is determined can be a reference parallel to the plane of gravity, or any other theoretical plane between zero and three-hundred sixty degrees therefrom. By determining such a directional reference (e.g., the actual or relative angular orientation of the body), the movement and/or direction of flight of the body may be controlled within a six degree of freedom model.

Figure 1:
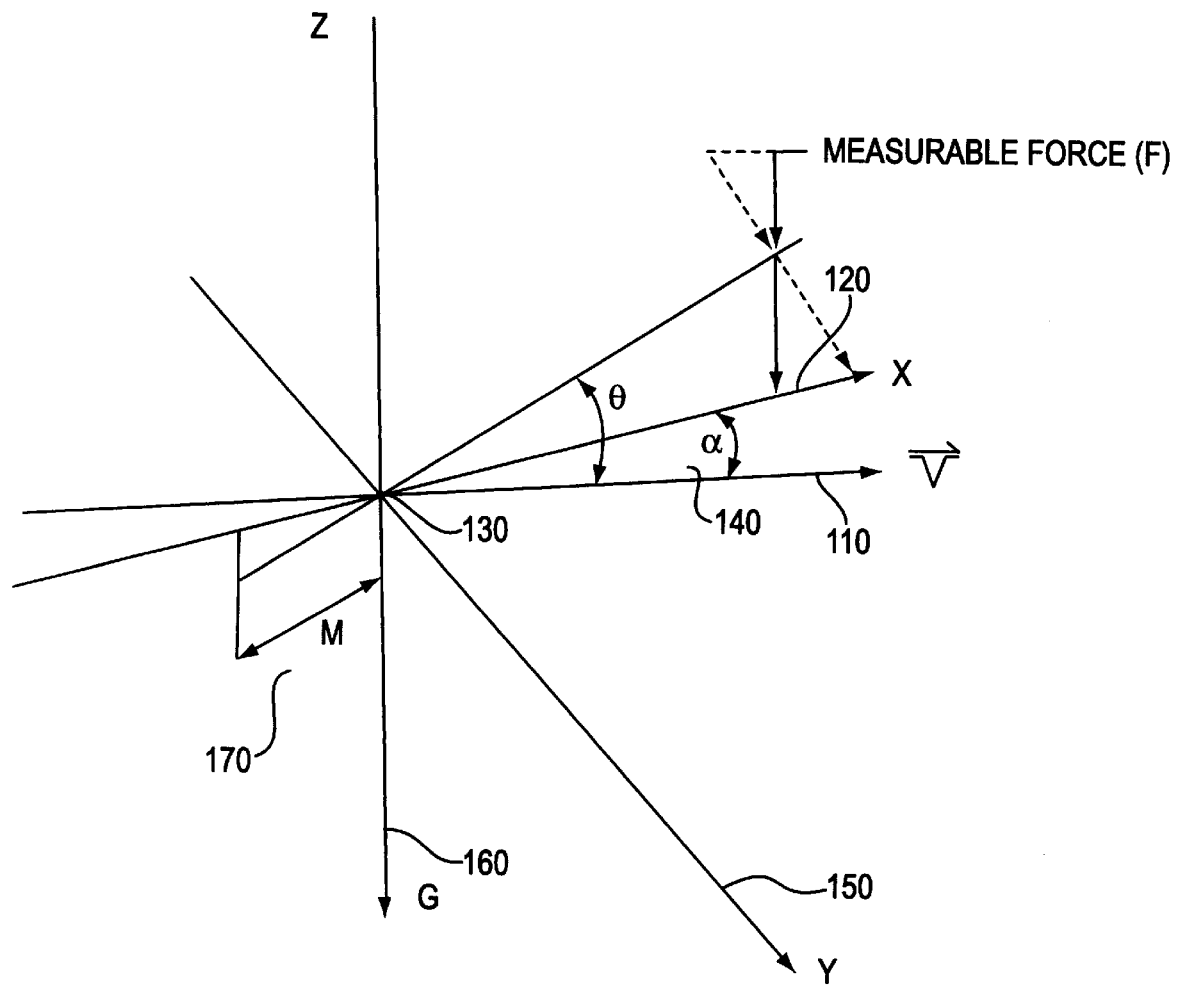
FIG. 1 depicts certain attitudes and axis of a body moving in object space together with relevant forces (gravity and aerodynamic moment) acting upon that body.

Unlike conventional devices which can be used to determine angular orientation (such as those described above), the present invention requires neither complex electronic or mechanical devices, nor external support systems. Rather, the present invention utilizes a comparatively simple system to measure natural forces—forces present in any body moving in object space as described above. FIG. 1 illustrates these forces.

Referring to FIG. 1, vector 110 represents the velocity vector (V) of a body B (not shown) moving in object space. Velocity vector 110 is a resultant vector of the velocity components of the body. Arrow 120 represents the longitudinal axis of body B, with the gravimetric center of gravity (COG) of body B located at 130. As shown in FIG. 1, longitudinal axis 120 has a variance in attitude relative to velocity vector 110. This variance in attitude, α140, is commonly known as the angle of attack of body B. Axis Y 150 represents the transverse axis of body B, and also represents the axis through which forces causing angle of attack α140 act and also represent the direction of the wind vectors which are perpendicular to the gravitational plane.

As further shown in FIG. 1, the force of gravity (G) acts "downward" along axis Z 160, and gives rise to angle of attack α140 by acting on body B through the X-Z plane. The aerodynamic moment (M) 170, which acts around center of gravity 130, will (for an aerodynamically stable body) tend to decrease angle of attack α140 towards zero.

Due to body B's mass moment of inertia (I) around the Y axis, the relationship between the aerodynamic moment M 170 and angle of attack α140 can be expressed as follows:

$$M(\text{moment}) = I\ \alpha;\ \text{with maximum } \alpha => I\phi. \quad \text{(Equation 1)}$$

Moreover, as the aerodynamic moment M 170 can be considered to be negative for an aerodynamically stable body, negative M will tented to reduce the magnitude of angle of attack α140 towards zero. This, in fact, is the force to be sensed which will always be parallel to the plane of gravity for a vehicle and a scenario as described as a useful embodiment herein. The Measurable Force (F) will be perpendicular to the longitudinal axis 120 of the body, and substantially perpendicular to the velocity vector 110.

As is well understood, the force of gravity (G) universally and perpetually exists. Accordingly, for any body B moving along velocity vector 110 in object space, angle of attack α140 will always exist and will be constantly changing. Moreover, owing to the directional constancy of G, the velocity vector of such a body B will be below (or "negative" to) the longitudinal (aerodynamic) axis 120 and in the X-Z plane.

Thus, aerodynamic moment M 170, acting across the Y body axis, will continuously attempt to reduce angle of attack α140 towards zero. As shown by Equation 1, assuming mass moment of inertia I≈0, then φ (the maximum angle of attack) will also approach zero. However, owing to a lag effect and gravity, angle of attack α140 will always exist. The angle θ represents the maximum angle of attack α. The Θ indicates the second derivative of the angle (the acceleration rate of change). The maximum angle of attack θ like the angle of attack is fluid and dynamic and constantly changing as a function of all those aerodynamic forces acting through the body center of pressure including velocity drag, wind vectors, lift vectors, gravity, body aerodynamic stiffness as a function of the body's mass moments of inertia, et al.

Illustration of the aforementioned forces on an exemplary Glide Bomb may prove helpful. Assume a spin-stabilized (rotating) glide bomb with a mass of 1000 Kg and an approximate diameter of 50 cm. The glide bomb may be nose tossed or dropped with an initial velocity of 200 M/s and guided via an on-board sensor/seeker or other means. Such a glide bomb would, for optimum aerodynamic flight, have its moment of inertia approximately 25 cm aft of its center of gravity (approximately 50% of its body diameter). Given these parameters, such a glide bomb would typically have an angle of attack on the order of 0.1 to 0.3 degrees.

Owing to natural aerodynamic forces acting behind (or, alternatively ahead of) the center of gravity, the moment forces will correspondingly be behind (or ahead) the center of gravity. However, with most bodies described herein that could benefit from the present invention, the moment of inertia will be slightly behind the center of gravity. Accordingly, the aerodynamic moment (including such possible forces as wind vectors) will cause angle of attack α140 to be described classically as positive (or "up") and the aerodynamic moment M to be described as negative (or "below").

Like the exemplary glide bomb, manned aircraft typically have a natural positive attitude, caused in part by the location of the mass moment of inertia with respect to the center of gravity of the aircraft and by other aerodynamic forces (e.g., wind vectors). Only through constant "trimming" (either manual or automatic) can the aircraft be maintained along a desired velocity vector. As explained above, the body attitude of the aircraft (longitudinal axis) will differ from the velocity vector by the solid angle of attack α.

In each of the examples presented above, the magnitude of the aforementioned wind vectors will typically vary in proportion to the velocity of the moving body. Moreover, if the aerodynamic moment of the body is aft of the center of gravity, the direction of the wind vectors will similarly be parallel to the gravity plane and, again, positive or "up."

Thus, taking into consideration the various forces and characteristics described above, it becomes clear that the resolved forces combine to produce angle of attack α140— the amount by which longitudinal axis 120 varies from velocity vector 110 of body B in the X-Z plane. For a given body B, the force necessary to produce angle of attack α140 can be expressed generally as follows:

$$\text{Force}(F) = q(S_V)(C_{N\alpha})(\alpha) \quad \text{(Equation 2)}$$

where q represents aerodynamic pressures (including atmospheric density) in $Kg/M^3$; $S_V$ is the cross sectional area of the body in $M^2$, directionally moving along velocity vector V; $C_{N\alpha}$ is the dimensionless aerodynamic coefficient, empirically measured and quantified through non-arbitrary testing (e.g., wind tunnel experimentation) and calculable via established codes associated with specific body types; and a is the angle of attack.

For bodies of the type which would typically benefit from the invention disclosed herein, $C_{N\alpha}$ would reasonably range from about 2 to about 30. Returning again to the Glide Bomb example, and assuming α=0.1 degrees and $C_{N\alpha}$=5, Equation 2 predicts that the magnitude of the force (F) acting on the bomb would be on the order of 41.9 Newtons. Importantly, force F would always be directed parallel to the directional orientation of the angle of attack. Thus, any means which can be used to measure the magnitude of this force can thereby be used also to determine the direction of the force—and thereby to determine the angular orientation of the body B.

Figure 2:
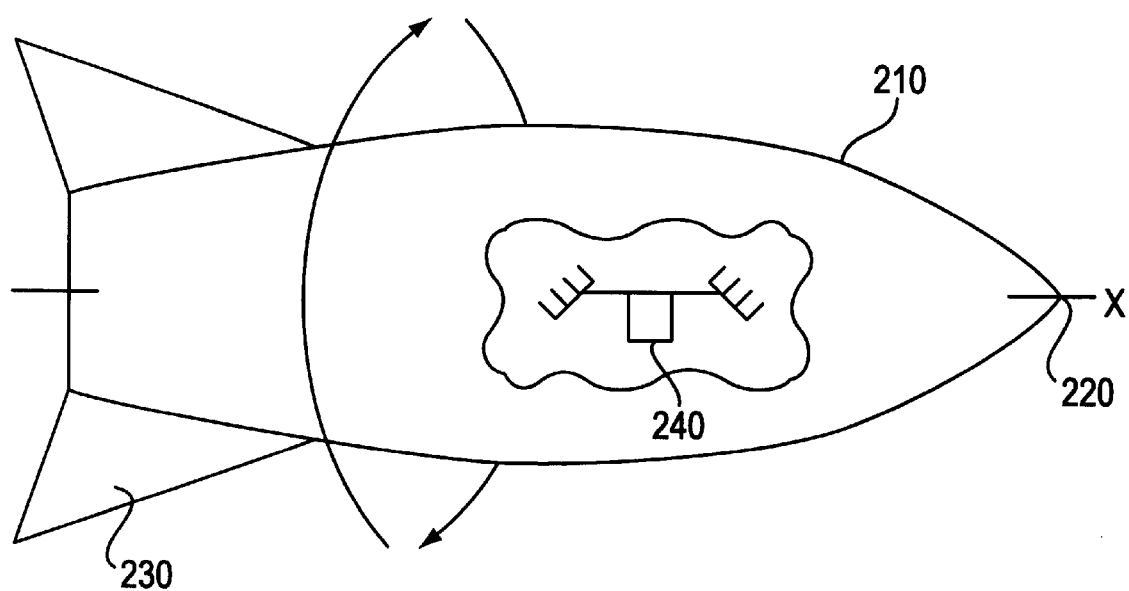
FIG. 2 depicts a guided glide bomb incorporating one embodiment of the present invention.

Referring now to FIG. 2, operation of the invention can be described. FIG. 2 depicts a glide bomb 210 with a longitudinal axis 220. Owing to stabilization fins 230, glide bomb 210 rotates about longitudinal axis 220 while in flight. In one embodiment of the present invention, accelerometer 240 is mounted within glide bomb 210, parallel to longitudinal axis 220 and aligned with a known transverse axis of the bomb.

As explained above, force F associated with angle of attack α 140 will always be parallel to the directional orientation of the angle of attack. In the exemplary glide bomb, force F acting to reduce the angle of attack α=0.1 degrees would be directed "up", and on the order of 41.9 Newtons. Accelerometer 240 could therefore be of any type capable of withstanding a force of approximately 50 Newtons, plus launch and environmental forces, and with sufficient accuracy to resolve a force of approximately one Newton.

Figure 3:
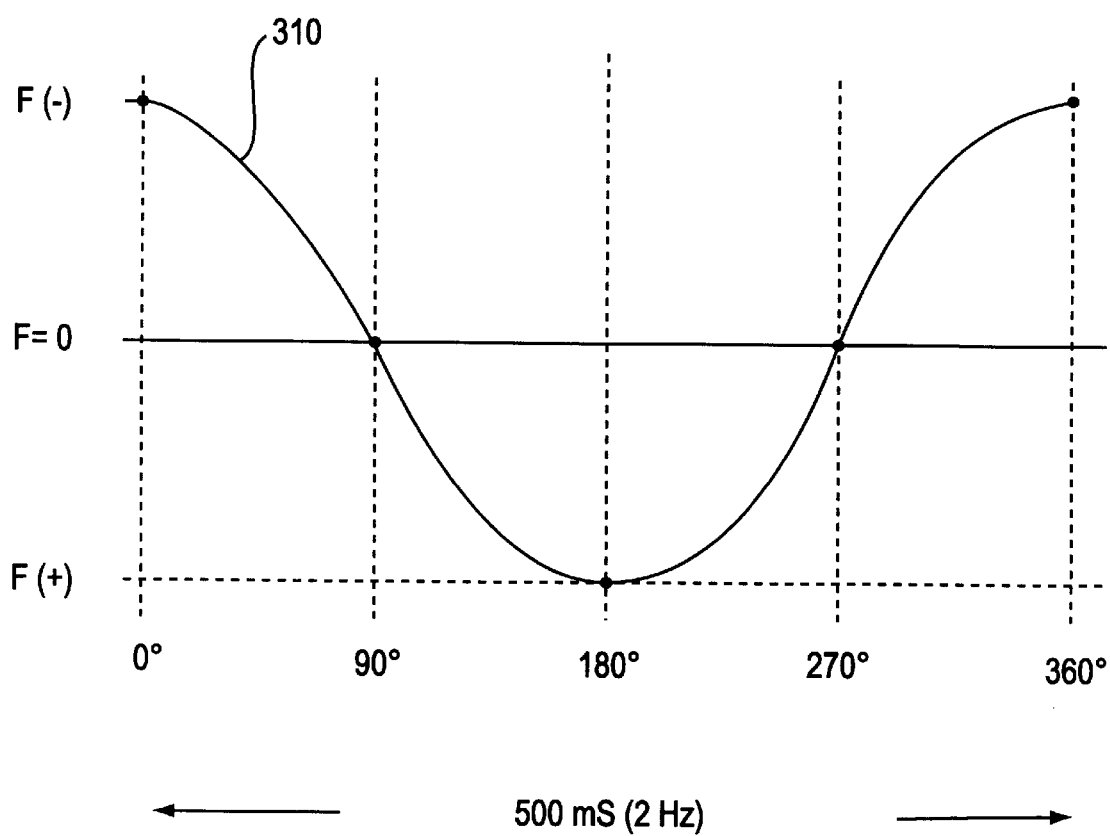
FIG. 3 depicts the output from an analog sensor according to one embodiment of the present invention.

With exemplary glide bomb 210 rotating at 2 Hz, the output of accelerometer 240 (representing the force associated αand the continuous changing angular orientation of the body due to its rotation) would appear as a cosine waveform (or conversely, a sine waveform). As shown in FIG. 3, the force F 310 measured by accelerometer 240 during each revolution of glide bomb 210 would increase and decrease geometrically according to a cosine (or sine) function. Of course, forces due to buffeting and/or natural frequencies may stocastically occur (and would appear superimposed on force F). However, because these forces are random in nature, they may be filtered out through the use of filtering algorithms or other known techniques.

Referring still to FIG. 3, the periodicity of the maximum ("peak") plus and minus forces (e.g., as derived from the output of accelerometer 240) denote the vector angular position (e.g., the angular orientation) of the plane parallel to the sensed force F. Thus, by knowing this "zero" directional reference and the real time period between the two plus/minus peaks, an accurate zero directional reference is established. By integrating the accelerometer output over a plurality of bomb revolutions, even greater accuracy can be achieved. Moreover, owing to the periodicity of the rotation, directional references for any desired angular position between the values of the plus/minus peaks (e.g., zero to three-hundred sixty degrees) can similarly be obtained.

Figure 4:
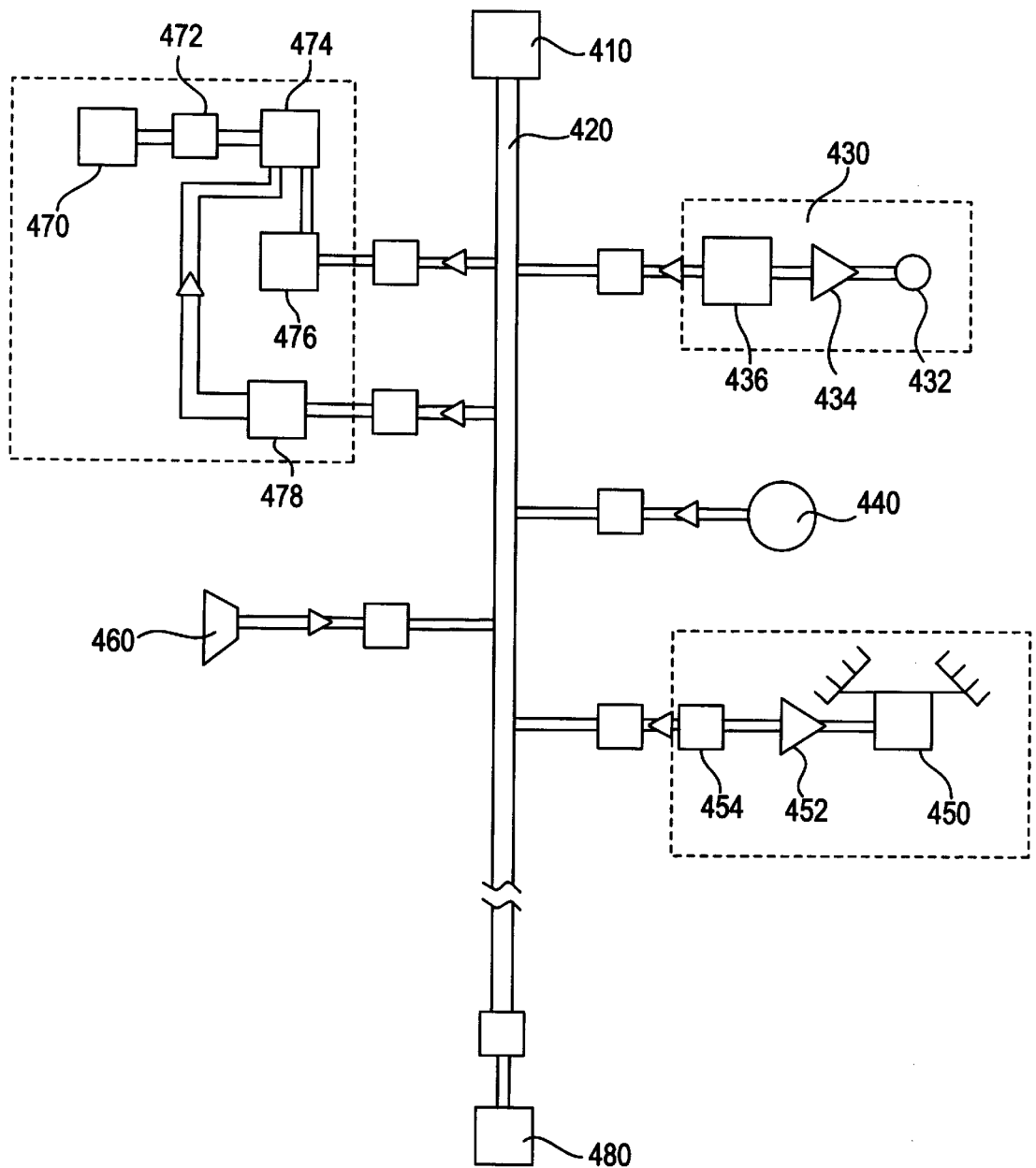
FIG. 4 depicts a block diagram of an on-board system of the present invention.

One skilled in the art will immediately recognize that various computational means may be used to process the signal representing sensed force F. One system ideally suited for such use is depicted in FIG. 4. However, to avoid obfuscation of the present invention, support and interface componentry useable for interconnecting the system disclosed below will neither be shown nor described in detail. One skilled in the art will appreciate the nature of the interconnections to be made, and various techniques for accomplishing such interconnections.

As shown in FIG. 4, primary on-board computational means 410 is connected via Input/Output ("I/O") bus 420 to vehicle seeker 430, real time clock 440, acceleration sensor 450, power supply 460, navigation/guidance means 470 and miscellaneous support componentry 480. Computational means 410 may preferably comprise any readily available microprocessor, a custom microprocessor or ASIC, or similar processing means. Vehicle seeker 430 includes target sensor 432, signal amplifier 434 and target position computer 436. Acceleration sensor 450 includes output amplifier 452 and (if analog) A-to-D converter 454. Finally, navigation/guidance means 470 includes D-to-A converter 472, navigation/guidance computer 474, seeker output buffer 476 and vehicle computed zero reference unit 478.

In operation, the output from acceleration sensor 450 is passed via I/O bus 420 to primary on-board computational means 410. As described above, computational means 410 processes this signal to determine a zero directional reference associated with the plus/minus peaks of the output from sensor 450. This information is then passed, again via I/O bus 420, to vehicle computed zero reference unit 478 where it is made available to navigation/guidance means 470. The information could similarly be transmitted to a suitable ground-based or airborne receiver.

As depicted in FIG. 4, acceleration sensor 450 is conveniently mounted along the longitudinal axis 490 of vehicle B, in alignment with a known transverse axis. One skilled in the art will recognize that alternative mounting and/or alignment configurations are possible, and may in certain instances be preferable.

Although the embodiment described immediately above involves a rotating body, the present invention is equally applicable to any body which moves in object space along a velocity vector and which will therefore have a corresponding angle of attack. In such cases, the sinusoidal output of the acceleration sensor will be replaced by a signal varying in amplitude in proportion to varying a. In such a case, the acceleration sensor output may nonetheless be similarly processed to determine the peak value which again will represent the point in time when the sensor is aligned with the plane of gravity. In addition, repetitive sampling, integration and/or other processing may be employed to increase the accuracy of the angular orientation determination.

Although the present invention has been exemplified in the foregoing discussion through the use of specific examples, one skilled in the art will recognize that other sensor types and system configurations can readily be substituted. For example, accelerometer 240/450 may range from a simple electro mechanical device to a more sophisticated machined silicon solid-state device. Other types of force measuring devices (both analog and digital) could also be used. Thus, while the present invention has been particularly shown and described with reference to a preferred embodiment thereof, it will be understood by those skilled in the art that various changes in form and detail may be made without departing from the spirit and scope of the invention.

I claim:

1. An orientation reference system for a body moving in object space and having an angle of attack, said system comprising:

means for generating a signal in proportion to said angle of attack of said body irrespective of the speed of movement of said body; and means for processing said signal to determine a time when said body has a predetermined angular relationship with the plane of gravity.

2. The system of claim 1, wherein said generating means comprises a sensor having an analog output.

3. The system of claim 2, wherein said analog sensor comprises an accelerometer.

4. The system of claim 1, wherein said generating means comprises a sensor having a digital output.

5. The system of claim 1, wherein said predetermined angular relationship is an angle between zero and three hundred sixty degrees.

6. The system of claim 1, wherein said predetermined angular relationship is zero degrees.

7. The system of claim 1, wherein said predetermined angular relationship is ninety degrees.

8. The system of claim 1, wherein said processing means is contained within said body.

9. The system of claim 1, wherein said processing means comprises a computer.

10. The system of claim 9, wherein said computer is a digital computer, said digital computer configured to accept and process said signal from said generating means.

11. A vertical orientation reference system for a body moving in object space and having an angle of attack, said system comprising:

a sensor mounted within said body for generating a signal in proportion to said angle of attack of said body irrespective of the speed of movement of said body; and a computer for processing said signal to determine a time when a portion of said body is parallel with the plane of gravity.

12. The system of claim 11, wherein said sensor is an accelerometer.

13. The system of claim 12, wherein said computer is contained within said body.

14. An orientation reference system for a body moving in object space and having an angle of attack caused by a force, said system comprising:

a sensor mounted within said body for generating a signal in proportion to said force irrespective of the speed of movement of said body; and means for processing said signal to determine a time when a portion of said body has a predetermined angular relationship with the plane of gravity.

15. The system of claim 14, wherein said sensor is an accelerometer.

16. The system of claim 15, wherein said processing means is contained within said body.

17. A method for determining the angular orientation of a body moving in object space relative to plane of gravity and having an angle of attack created by the sum of the forces acting around the moment between the center of pressure and the center of gravity, said method comprising the steps of:

generating a signal in proportion to said angle of attack irrespective of the speed of movement of said body; and processing said signal to determine said angular orientation of said body.

18. The method of claim 17 wherein an analog sensor is used to generate said signal.

19. The method of claim 18, wherein said analog sensor is configured to output a maximum signal when said sensor is aligned with the plane of gravity.

20. The method of claim 18, wherein said analog sensor is configured to output a maximum signal when said sensor is perpendicular to the plane of gravity.

21. The method of claim 17, wherein said processing step includes sampling said signal more than one time and processing said more than one sample to determine said angular orientation.

22. An orientation reference system for a body moving in object space, whether rotating or stable, and having an angle of attack, said system comprising:

means for generating a signal in proportion to said angle of attack of said body irrespective of the speed of movement of said body; and means for processing said signal to determine a time when said body has a predetermined angular relationship with the plane of gravity.

* * * * *